United States Patent
Hung et al.

(10) Patent No.: US 9,042,087 B2
(45) Date of Patent: May 26, 2015

(54) DOCKING STATION AND ELECTRONIC APPARATUS USING THE SAME

(75) Inventors: Cheng-Chih Hung, Taipei (TW); Kuan-Ting Chen, Taipei (TW); Hsuan-Wu Wei, Taipei (TW); Ming-Chin Yang, Taipei (TW)

(73) Assignee: ASUSTeK COMPUTER INC., Taipei, Taiwan (TW)

( * ) Notice: Subject to any disclaimer, the term of this patent is extended or adjusted under 35 U.S.C. 154(b) by 197 days.

(21) Appl. No.: 13/087,382

(22) Filed: Apr. 15, 2011

(65) Prior Publication Data
US 2011/0292584 A1    Dec. 1, 2011

Related U.S. Application Data

(60) Provisional application No. 61/349,215, filed on May 28, 2010.

(51) Int. Cl.
*H05K 5/00* (2006.01)
*H05K 7/00* (2006.01)
*E04G 3/00* (2006.01)
*G06F 1/16* (2006.01)

(52) U.S. Cl.
CPC ............ *G06F 1/1632* (2013.01); *G06F 1/1626* (2013.01)

(58) Field of Classification Search
USPC ............... 361/679.01, 679.02, 679.06–679.3, 361/679.09, 679.55–679.59
See application file for complete search history.

(56) References Cited

U.S. PATENT DOCUMENTS

| | | | | |
|---|---|---|---|---|
| 6,108,200 A | * | 8/2000 | Fullerton | 361/679.12 |
| 2004/0090742 A1 | * | 5/2004 | Son et al. | 361/686 |
| 2010/0238620 A1 | * | 9/2010 | Fish | 361/679.09 |

FOREIGN PATENT DOCUMENTS

| | | |
|---|---|---|
| CN | 2574113 | 9/2003 |
| CN | 1499393 | 5/2004 |
| JP | H10-326121 | 12/1998 |
| JP | 2005158013 | 6/2005 |
| JP | 2008233986 | 10/2008 |

OTHER PUBLICATIONS

"Office Action of Japan Counterpart Application", issued on Nov. 27, 2012, p. 1-p. 2.

* cited by examiner

*Primary Examiner* — Jerry Wu
(74) *Attorney, Agent, or Firm* — Jianq Chyun IP Office (57) ABSTRACT

A docking station and an electronic apparatus using the same are provided. The electronic apparatus includes a portable computer and a docking station. The docking station includes a body, a base and a connecter, and the portable computer is detachably connected to the docking station. The base is movably connected to the body. The connecter disposed on the base is movable with the base relative to the body. The body is electrically connected to the portable computer via the connecter, and thus the portable computer can move relative to the docking station.

6 Claims, 7 Drawing Sheets

DOCKING STATION AND ELECTRONIC APPARATUS USING THE SAME

CROSS-REFERENCE TO RELATED APPLICATION

This application claims the priority benefits of U.S. provisional application Ser. No. 61/349,215, filed on May 28, 2010. The entirety of the above-mentioned patent applications is hereby incorporated by reference herein and made a part of this specification.

BACKGROUND OF THE INVENTION

1. Field of the Invention

The invention relates to a docking station and an electronic device using the same and, more particularly, to a docking station with a movable connector and an electronic device using the same.

2. Description of the Related Art

Comparing with a conventional desktop computer, a portable computer is light, small, and thin. It is portable to facilitate the user operating the computer under various environments. However, the portable computer lacks expansibility due to its small size.

BRIEF SUMMARY OF THE INVENTION

A docking station is provided for a portable computer to detachably connect to and allow the portable computer to move with a base.

The docking station includes a body, a base and a connector. The base is movably connected to the body, and the connector is disposed at the base to move with the base relative to the body. The body is electrically connected to the portable computer via the connector to allow the portable computer to move relative to the docking station.

An electronic apparatus is provided. The portable computer is detachably connected to the docking station and moves relative to the docking station.

The electronic apparatus includes a portable computer and a docking station. The docking station is adapted for the portable computer to detachably connect thereto, and it includes a body, a base and a connector. The base is coupled to the body. The connector is disposed at the base to move with the base relative to the body. The body is electrically connected to the portable computer via the connector to allow the portable computer to move relative to the body.

As stated above, the connector is disposed at the base of the docking station for the portable computer to electrically connect thereto. The docking station allows the base to move relative to the body, and the portable computer moves relative to the body of the docking station via the base. Thus, the portable computer can expand its function via the docking station, and the user can also adjust the state and the viewing angle of the portable computer according to different requirements.

These and other features, aspects and advantages of the present invention will become better understood with regard to the following description, appended claims, and accompanying drawings.

DETAILED DESCRIPTION OF THE EMBODIMENTS

Figure 1A:
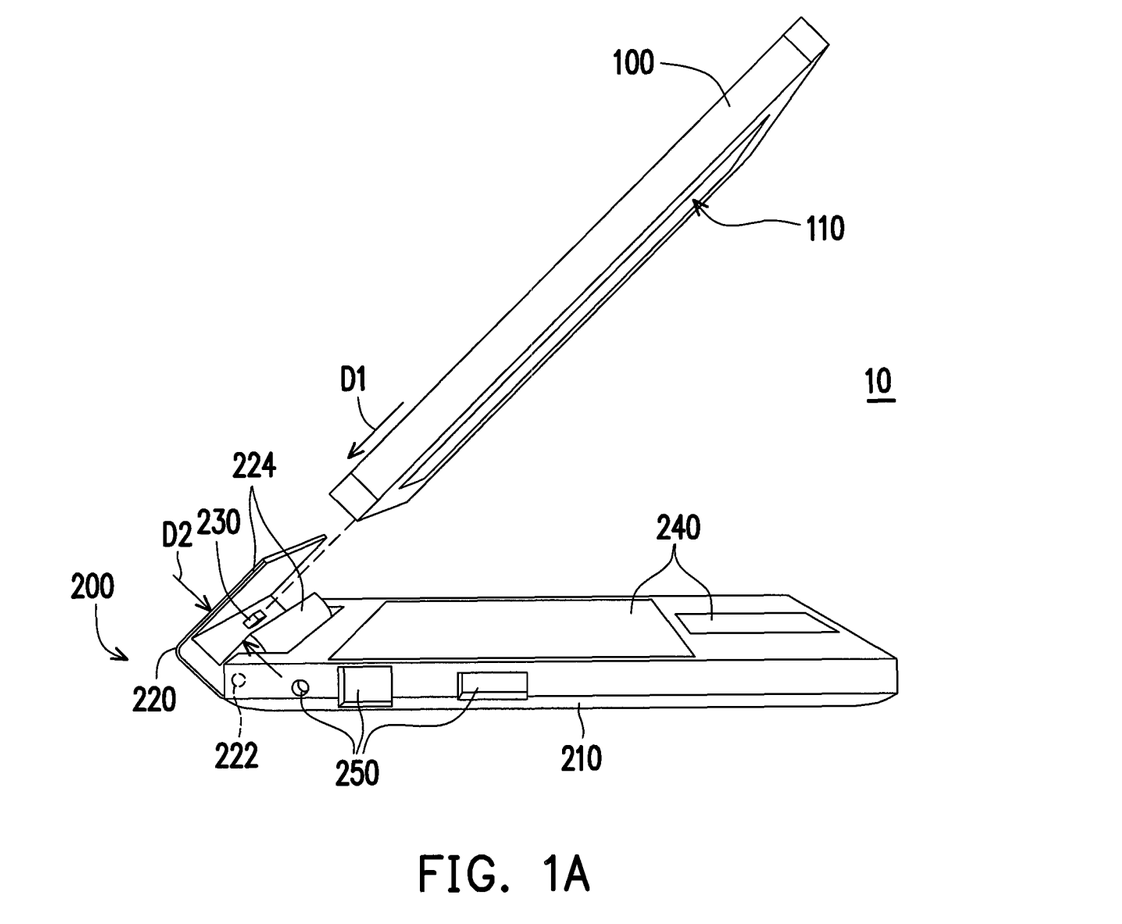
FIG. 1A is a schematic diagram showing an electronic apparatus in a first embodiment.
Figure 1B:
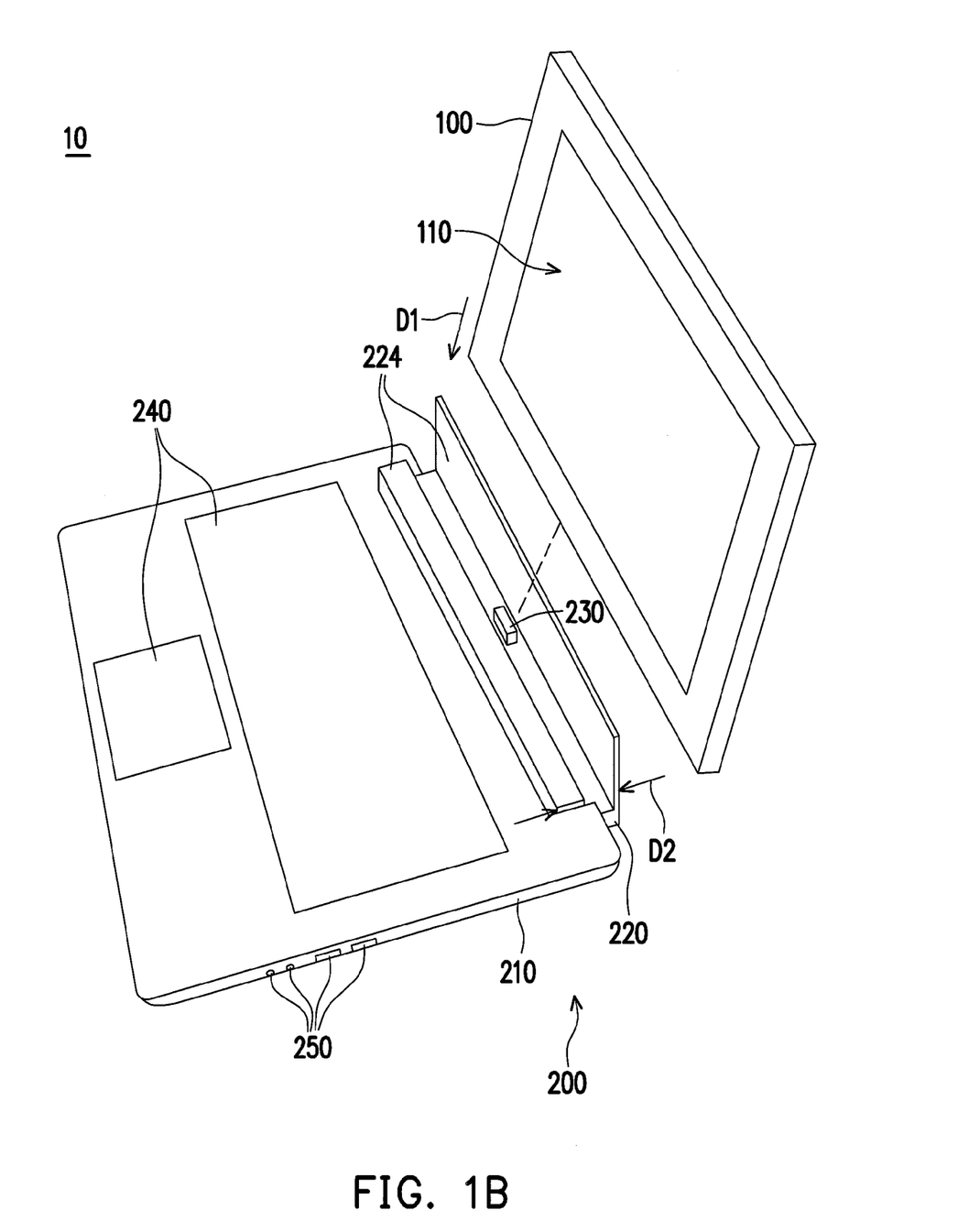
FIG. 1B and FIG. 1C are schematic diagrams showing the electronic apparatus in FIG. 1A in different states, respectively.
Figure 1C:
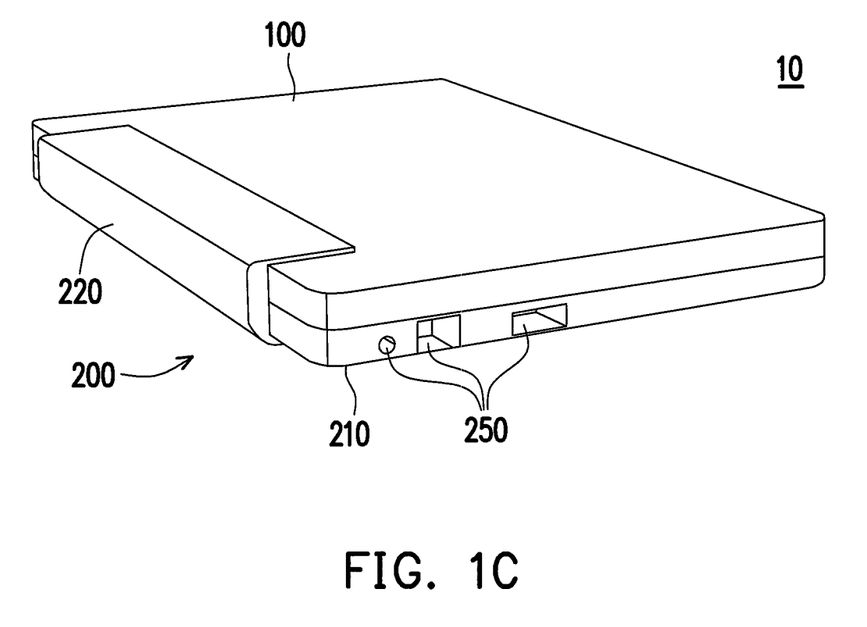

FIG. 1A is a schematic diagram showing an electronic apparatus in a first embodiment. FIG. 1B and FIG. 1C are schematic diagrams showing an electronic apparatus in FIG. 1A in different states, respectively.

Please refer to FIG. 1A to FIG. 1C, in the embodiment, the electronic apparatus 10 includes a portable computer 100 and a docking station 200. The portable computer 100 may be a tablet computer or a portable computer with independent operation and display functions, which is not limited herein. The docking station 200 allows the portable computer 100 to be detachably connected thereto, and thus it can be used as an extension port of the portable computer 100 to improve the expandability and convenience of the portable computer 100 for the users.

In the embodiment, the portable computer 100 includes a display panel 110. The docking station 200 includes a body 210, a base 220 and a connector 230. The base 220 is movably connected to the body 210, and the connector 230 is disposed at the base 220. When the portable computer 100 is connected to the base 220 of the docking station 200 via the connector 230, the portable computer 100 can move relative to the body 210 via the base 220. That is, the position (or the view angle) of the portable computer 100 disposed at the docking station 200 can be adjusted correspondingly according to the operating state and the users' requirements. Thus, it is avoided that the portable computer 100 disposed at the docking station 200 is fixed at the docking station 200 and is not movable.

In detail, the base 220 includes a hinge 222 connected to the body 210 to make the base 220 rotate relative to the body 210, and make the portable computer 100 disposed thereon move between an open state (shown in FIG. 1B) and a close state (shown in FIG. 1C) relative to the docking station 200. Moreover, the docking station 200 further includes a physical input module 240, such as a keyboard module or a touch pad module disposed at the body 210 and multiple connecting ports 250, such as a power connecting port, a sound source connecting port or a universal serial bus (USB) connecting port. Consequently, after the portable computer 100 is disposed at the docking station 200 along the assembly direction D1 parallel to the display panel 110, the portable computer 100 can include electrical or signal communication with peripheral devices (not shown) to support or expand the portable computer 100.

Figure 2:
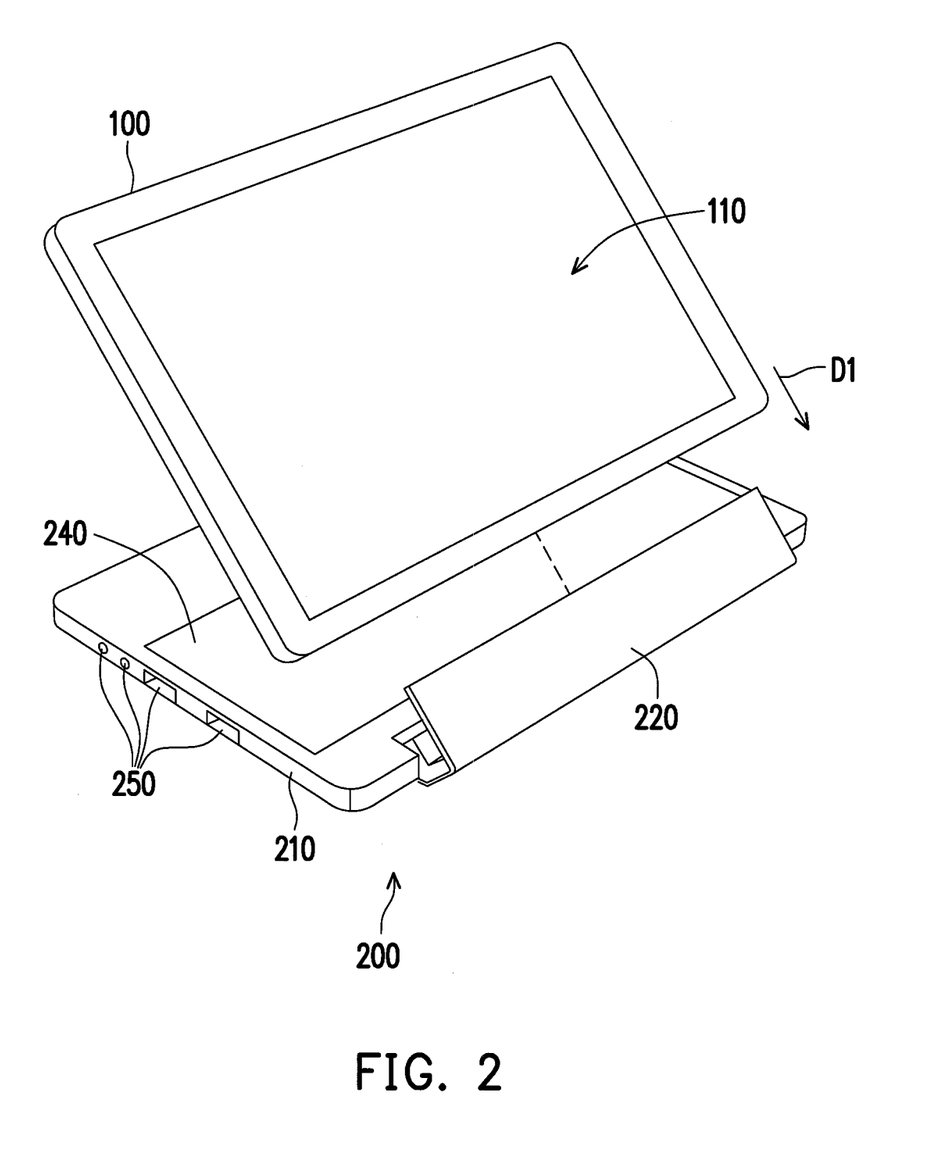
FIG. 2 is a schematic diagram showing an electronic apparatus in FIG. 1A in another state.

FIG. 2 is a schematic diagram showing an electronic apparatus in FIG. 1A in another state. Please refer to FIG. 1C and FIG. 2. In the embodiment of FIG. 1C, when the portable computer 100 is at the close state relative to the docking station 200, the display panel 110 (shown in FIG. 1A) faces the body 210 of the docking station 200. However, in the embodiment in FIG. 2, since the connector 230 at the base 220 is a multi-direction connector in the close state as shown in FIG. 1C, the display panel 110 of the portable computer 100 can back towards the body 210 of the docking station 200 according to the operation environment, so as to expand the application scope of the portable computer 100.

Moreover, please refer to FIG. 1A and FIG. 1B, in order to connect the portable computer 100 to the connector 230 of the docking station 200 more smoothly, the base 220 further includes a fixing part 224, and the fixing part 224 holds the portable computer 100 along the fixing direction D2 vertical to the display panel 110. For example, in the embodiment, the base 220 of the docking station 200 is a concave portion, the fixing part 224 is two sidewalls of the concave portion, and the connector 230 is at the bottom of the concave portion. Consequently, when the portable computer 100 is connected to the connector 230, the sidewalls of the concave portion hold the portable computer 100 along the direction D2 to make the portable computer 100 embedded into the base 220.

Figure 3:
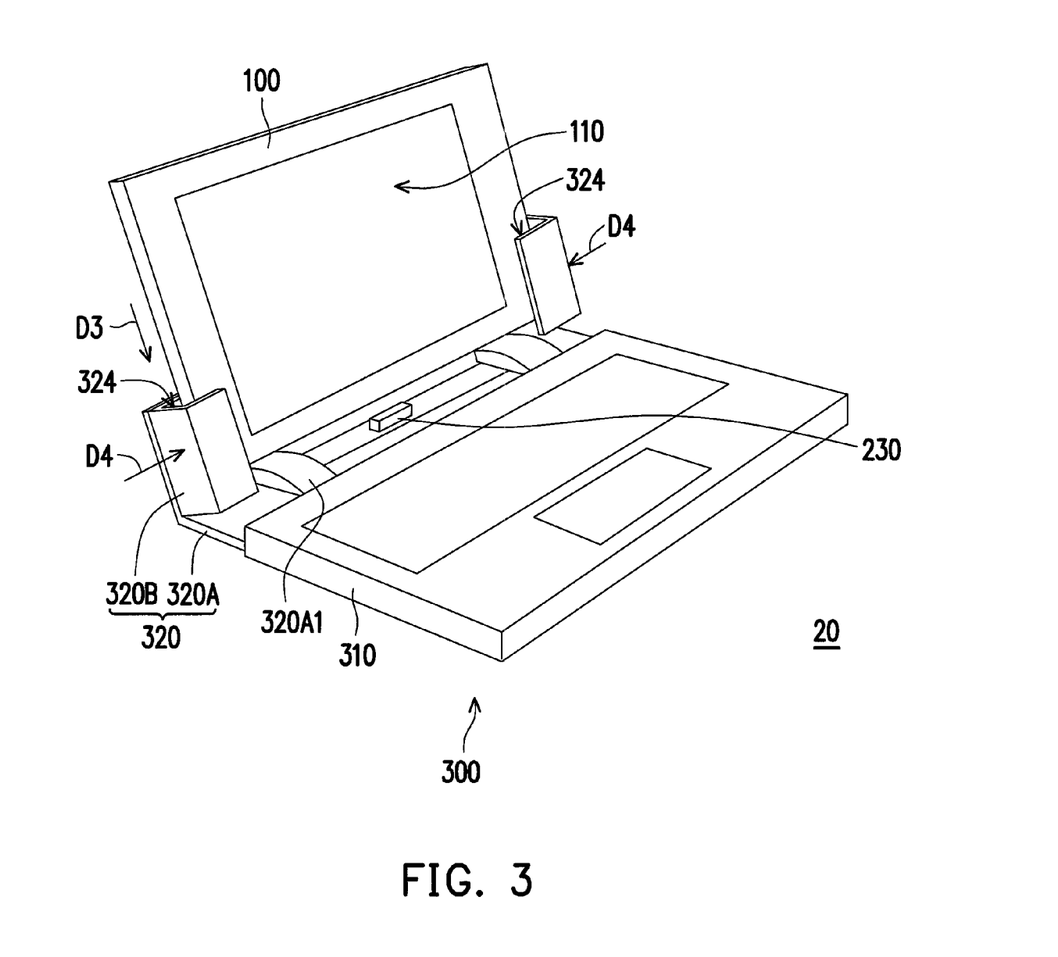
FIG. 3 is a schematic diagram showing an electronic apparatus in a second embodiment.

The fixing structure between the base and the portable computer is not limited. FIG. 3 is a schematic diagram showing an electronic apparatus in a second embodiment. Please refer to FIG. 3, the difference between the embodiment in FIG. 3 and the embodiments above is that the base 320 of the docking station 300 of the electronic apparatus 20 includes a first element 320A and a second element 320B. The first element 320A includes a hinge 320A1, which is the same as the hinge 222 in the above embodiment, to allow the first element 320A to rotate relative to the body 310. Moreover, the connector 230 is disposed at the second element 320B, and the second element 320B is movably connected to the first element 320A. Consequently, the portable computer 100 is connected to the second element 320B along the assembly direction D3 parallel to the display panel 110, and the fixing part 324 of the second element 320B holds the portable computer along the fixing direction D4 parallel to the display panel 110 (the direction D3 is vertical to the direction D4).

In other word, the portable computer 100 in the embodiment can be rotated and slid relative to the docking station 300 via the first element 320A and the second element 320B with different moving dimensions. The second element 320B can slide along the first element 320A via a slide rail or other structures, which is not limited. For example, the portable computer may also be fixed at the base via a magnetic structure.

Figure 4A:
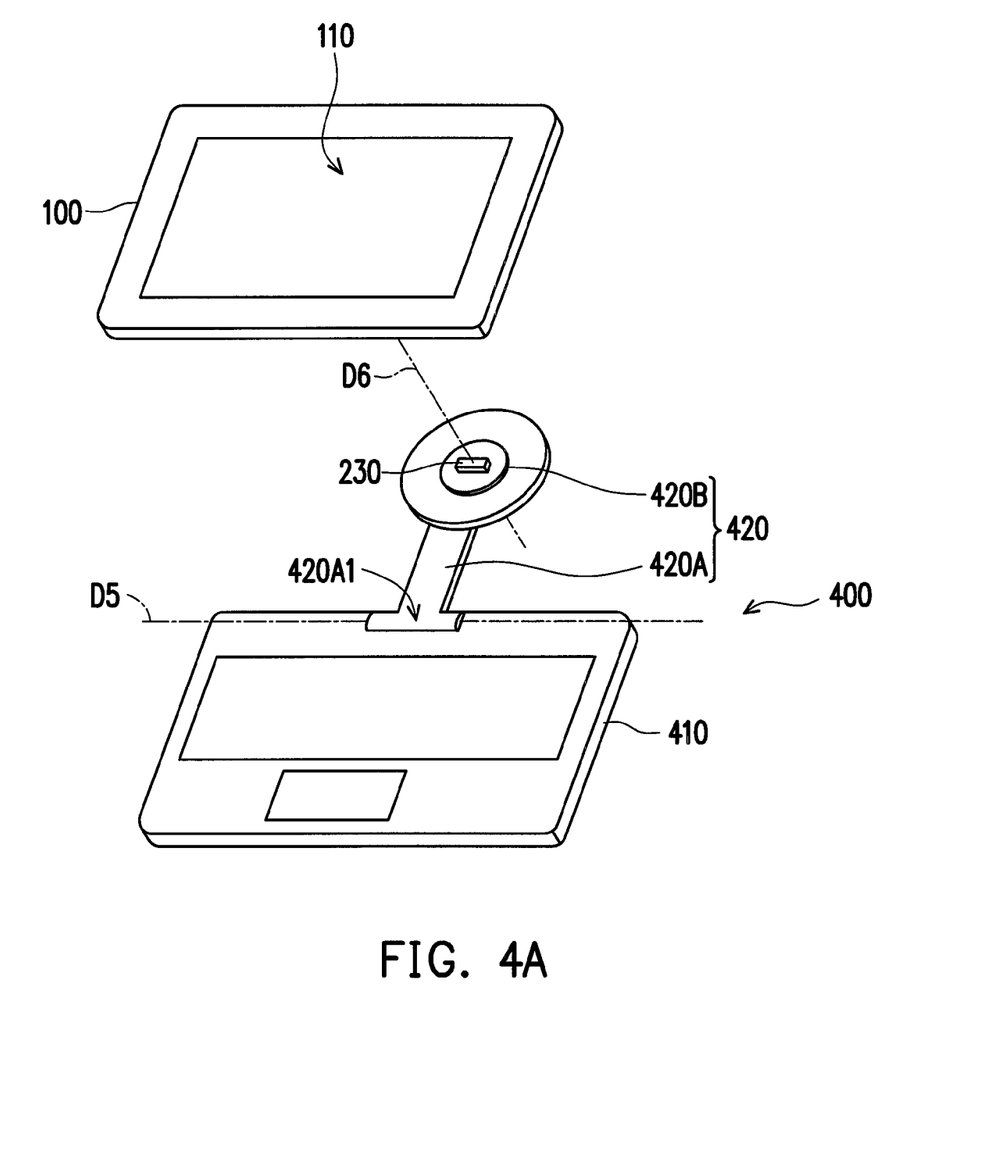
FIG. 4A is a schematic diagram showing an electronic apparatus in a third embodiment.
Figure 4B:
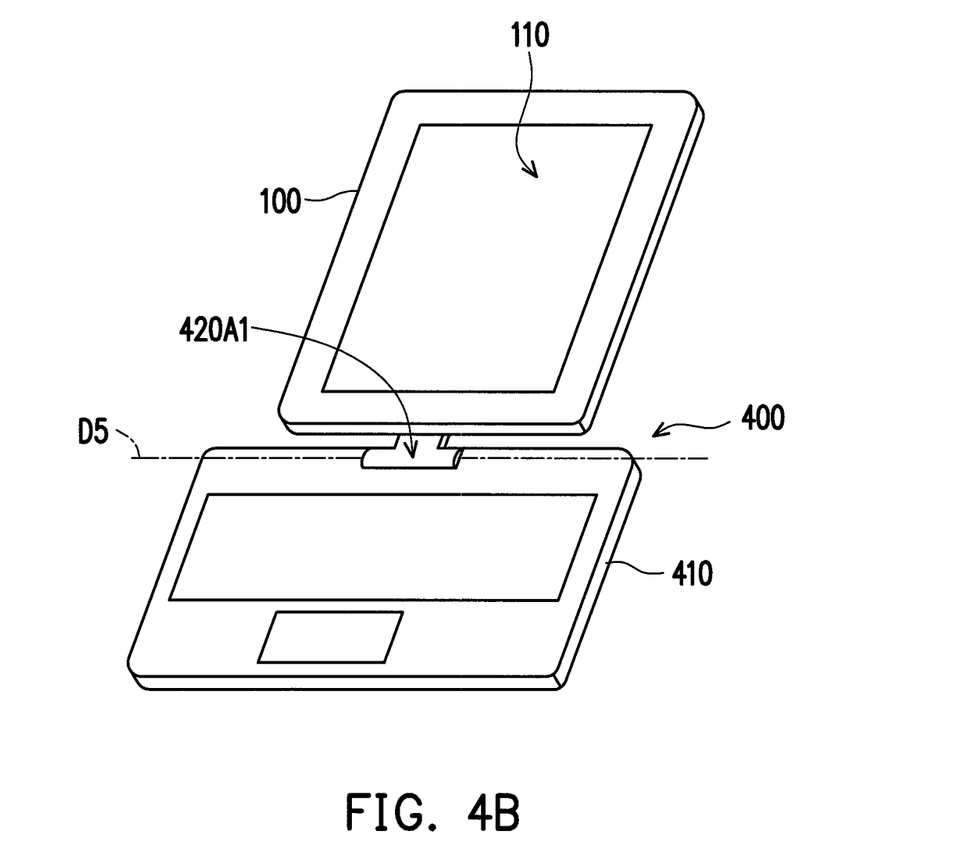
FIG. 4B is a schematic diagram showing an electronic apparatus in FIG. 4A in another state.

FIG. 4A is a schematic diagram showing an electronic apparatus in a third embodiment. FIG. 4B is a schematic diagram showing an electronic apparatus in another state in FIG. 4A. please refer to FIG. 4A and FIG. 4B, the difference between the third embodiment and the above embodiments is that the base 420 of the docking station 400 of the electronic apparatus 30 includes a third element 420A and a fourth element 420B, and the third element 420A includes a hinge 420A1 connected to the body 410 to allow the third element 420A to rotate along the direction D5 relative to the body 410. Furthermore, the fourth element 420B is coupled to one end of the third element 420A away from the hinge 420A1 to allow the fourth element 420B to rotate along the direction D6 relative to the third element 420A. The direction D5 is vertical to the direction D6. Thus, when the portable computer 100 is connected to the fourth element 420B along the direction vertical to the display panel 110, the portable computer 100 can rotate relative to the body 410 of the docking station 400 at different moving dimensions via the axial direction D5 and the axial direction D6, so as to meet requirements of the users under different environments.

In sum, in the embodiments above, the electronic apparatus is electrically connected to the portable computer via the base which can move relative to the body, and thus the function of the portable computer is expanded via the docking station.

Furthermore, the operating state and the view angle of the portable computer can be adjusted according to different usage requirements of the users, which is more convenience and comfort in using.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. A docking station for a portable computer to be detachably connected to, wherein the portable computer includes a display panel, the docking station comprising:
   a body;
   a base movably connected to the body, wherein the base is a concave portion, and the base comprises:
      a fixing part comprising two sidewalls of the concave portion, and the portable computer is clamped by the fixing part such that a force exerted on the display panel by the fixing part is in a direction perpendicular to the display panel; and
      a hinge disposed on one of the two sidewalls of the fixing part, wherein the hinge is connected to the body for the base to be rotated, and for the portable computer rotates relative to the docking station to an open state or a close state; and
   a connector disposed at the base to move with the base relative to the body, wherein the body is electrically connected to the portable computer via the connector for the portable computer to move relative to the docking station.

2. The docking station according to claim 1, wherein when the portable computer is at the close state relative to the docking station, the display panel of the portable computer faces or backs to the body.

3. The docking station according to claim 1, wherein the portable computer is a tablet computer, and the docking station further comprises a physical input module disposed at the body.

4. An electronic apparatus, comprising:
   a portable computer including a display panel; and
   a docking station detachably connected to the portable computer, wherein the docking station includes:
      a body;
      a base coupled to the body, the base is a concave portion, and the base comprises:
         a fixing part comprising two sidewalls of the concave portion, and the portable computer is clamped by the fixing part such that a force exerted on the display panel by the fixing part is in a direction perpendicular to the display panel; and
         a hinge disposed on one of the two sidewalls of the fixing part, wherein the hinge is connected to the body for the base to be rotated, and for the portable computer rotates relative to the docking station to an open state or a close state; and
      a connector disposed at the base to move with the base relative to the body, wherein the body is electrically connected to the portable computer via the connector to allow the portable computer to move relative to the body via the base.

5. The electronic apparatus according to claim 4, wherein when the portable computer is at the close state relative to the docking station, the display panel of the portable computer faces or backs to the body.

6. The electronic apparatus according to claim 4, wherein the portable computer is a tablet computer, and the docking station further comprises a physical input module disposed at the body.

* * * * *